(12) United States Patent
Herrmann et al.

(10) Patent No.: US 9,001,880 B2
(45) Date of Patent: Apr. 7, 2015

(54) DEVICE AND METHOD FOR IDENTIFICATION AND CANCELLATION OF CROSSTALK

(75) Inventors: Georg Herrmann, Ebermannstadt (DE); Hermann Hampel, Grosshabersdorf (DE); Ulrich Berold, Nuremberg (DE); Manfred Deinzer, Lauf (DE); Roman Tzschoppe, Uttenreuth (DE); Johannes B. Huber, Langensendelbach (DE)

(73) Assignees: Broadband United GmbH, Bielefeld (DE); iAd Gesellschaft für Informatik, Automatisierung und Datenverarbeitung mbH, Großhabersdorf (DE)

( * ) Notice: Subject to any disclaimer, the term of this patent is extended or adjusted under 35 U.S.C. 154(b) by 107 days.

(21) Appl. No.: 13/520,761

(22) PCT Filed: Jan. 5, 2011

(86) PCT No.: PCT/EP2011/000015
§ 371 (c)(1),
(2), (4) Date: Jul. 5, 2012

(87) PCT Pub. No.: WO2011/083077
PCT Pub. Date: Jul. 14, 2011

(65) Prior Publication Data
US 2012/0281746 A1 Nov. 8, 2012

(30) Foreign Application Priority Data
Jan. 7, 2010 (DE) .......................... 10 2010 004 178

(51) Int. Cl.
*H03H 7/30* (2006.01)
*H03H 7/40* (2006.01)
(Continued)

(52) U.S. Cl.
CPC ........................................ *H04B 3/32* (2013.01)

(58) Field of Classification Search
USPC ......................................................... 375/229
See application file for complete search history.

(56) References Cited

U.S. PATENT DOCUMENTS

| 6,553,085 B1 | 4/2003 | Trans |
| 6,996,230 B1 | 2/2006 | Chu et al. |

(Continued)

FOREIGN PATENT DOCUMENTS

| DE | 10 2007 018 585 A1 | 10/2008 |
| EP | 0 522 534 B1 | 10/1997 |

(Continued)

*Primary Examiner* — Tanmay Shah
(74) *Attorney, Agent, or Firm* — Rankin, Hill & Clark LLP

(57) ABSTRACT

Disclosed are devices and methods for identification and cancellation of interfering signals, especially far-end crosstalk (FEXT), in a communication system with at least two pairs of wires of a balanced line bundle. The devices include at least a cancellation circuit, which is connected downstream to dead time elements, an interference characteristic detection device and a cancellation control unit, which controls a setting of filter coefficients of an adaptive filter and the cancellation signal source. The adaptive filter is configured as a digital cancellation filter having filter coefficients separated in time by a first delay element having the delay time T, and having an adjustable additional delay time t, whereby the setting of the additional delay time τ takes place together with the setting of filter coefficients.

15 Claims, 5 Drawing Sheets

Figure 1:
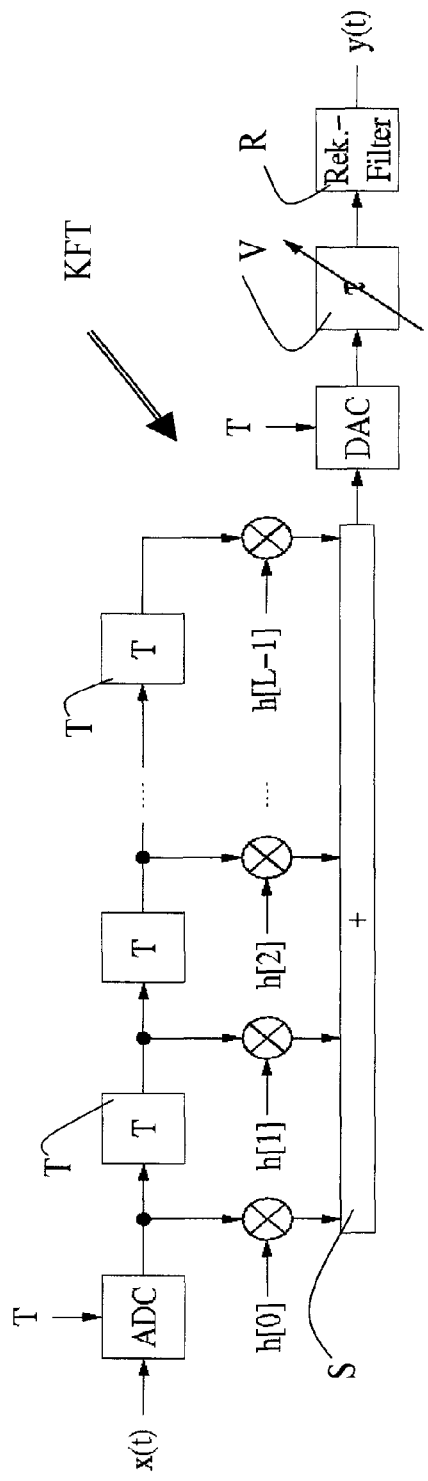

(51) Int. Cl.
*H03K 5/159* (2006.01)
*H04B 3/32* (2006.01)

(56) References Cited

U.S. PATENT DOCUMENTS 7,778,314 B2 * 8/2010 Wajcer et al. ................. 375/220

2001/0007479 A1   7/2001 Kim
2004/0156431 A1 * 8/2004 Agazzi et al. ................. 375/229

FOREIGN PATENT DOCUMENTS

EP   1 775 851 A1       4/2007
EP   1775851 A1 *       4/2007

* cited by examiner

DEVICE AND METHOD FOR IDENTIFICATION AND CANCELLATION OF CROSSTALK

The invention relates to a device for cancellation and identification of crosstalk. The invention also relates to a method for compensating for and identification of crosstalk.

One of the main limitations of today's fixed line communication systems using multi-pair cables for the transmission is crosstalk between wire pairs. By reducing the crosstalk could be range, data rate or stability (or in a compromise a combination of all) increased.

In principle, crosstalk could be reduced by replacing already installed cables by high quality cables (with reduced crosstalk). In LAN (local area network) environments this is a usual approach, if, e.g., the LAN is upgraded from 100 Mbps to 1 Gbps. However, within the local loop ("last mile"), the replacement of the access cable infrastructure is uneconomical.

For the latter case, it is more economical to implement methods and apparatus for crosstalk cancellation. In general there are 2 principal ways to compensate crosstalk.

Methods and apparatus for the solution of the problem of crosstalk, especially of near- and/or far-end crosstalk (NEXT and FEXT, respectively) are well known since a long time. The first option is the cancellation of crosstalk within the transceiver. This method was already suggested in 1995 in "IEEE Journal on Selected Areas in Communications, 1995, vol. 13, pp. 1643-1655" with the title "Bandwidth-Efficient Digital Transmission over Unshielded Twisted-Pair Wiring" from Im, G.-H. and Werner, J.-J. and, e.g., used in today's gigabit Ethernet transceivers. A disadvantage of this method is the need for knowledge of transmitted data and received data, respectively, of all adjacent channels whose crosstalk should be compensated. This necessity does not allow the later integration of crosstalk cancellation within existing network infrastructures according to the described method.

The second possibility is the external cancellation of crosstalk, i.e., outside of the communication equipment. This method has already been described in the European patent application 1 775 851 A1 of one of the applicants by a cancellation circuit, a cancellation unit and a method for the cancellation of crosstalk. The crosstalk cancellation circuit for detecting and cancellation of interfering signals, in particular of crosstalk signals from a crosstalk source of a communication system comprising at least two signal lines of a bundle of transmission lines, with a cancellation device comprising:

an input for an interfering signal, which receives an interfering signal stemming from the crosstalk source;
a cancellation control unit connected to the interference signal input;
a source of a cancellation signal connected to the cancellation control unit, comprising a controllable current source, and depending on the interfering signal, generates a cancellation signal for overlaying the first signal of the first signal line, by generating a controlled cancellation current for parallel signal feeding as a cancellation signal, so that, without a hybrid circuit for separating receive and transmit direction of line signals, a continuous flow of at least direct current on the transmission lines during cancellation of crosstalk between the transmission lines, is enabled.

According to the method for crosstalk cancellation described in the European patent application EP 1 775 851 A1 a cancellation current—derived from a crosstalk signal—is fed in parallel into the transmission line to be compensated. Unlike to the state of the art, feeding is not done in serial by a controlled voltage signal for cancellation. Because of the parallel feed in of the cancellation current, the transmission line to be compensated can remain uninterrupted for direct current (DC) (e.g., used for remote power feeding). Thus, the circuit permits simple remote power feeding of telecommunication components with DC voltage using the transmission line. For the generation of the cancellation signal the crosstalk impulse response is preferably used, in particular in such a way that an inverted crosstalk signal is replicated. The cancellation control can be relatively complicated, it generates the control signal $u_s(t)$, derived from a interfering signal $u_m(t)$ and depending on one or more parameters and coefficients h, respectively. The coefficients h can be determined by a determination mechanism nonrecurring or repeatedly, and be registered to the cancellation control unit. Crosstalk cancellation can be switched on and off. Therefore, a switch can be considered in the current feeding circuit. Instead of a switch the current source could be set to zero alternatively. The cancellation unit can be an adaptive filter or contain an adaptive filter. The adaptive filter is passed through by the line signal to be filtered. The reference voltage of the adaptive filter corresponds to the interfering signal $u_m(t)$. The adaptive filter can have filter coefficients according to which filtering is done. The filter coefficients can be set nonrecurring or repeatedly. The filter coefficients can be coefficients which describe the crosstalk impulse response, for example, as sample values over time. The adaptive filter feeds a suitably controlled current parallel into the transmission line (or into a pass-through circuit). The cancellation circuit can have delay circuits or dead time circuits at both input/output sides. They should delay the crosstalk impulse response on a telecommunication cable to provide more time to a cancellation unit to cause the cancellation, and the effort for the analog circuit can be diminished or even ceased completely. Advantageous of this method is the fundamental independence from the data transmission systems which allows a subsequent installation of the cancellation system in existing networks.

In many publications, also for other technical applications, a cancellation filter is implemented nowadays as a pure digital adaptive filter. In the European patent application EP 1 775 851 A1 of one of the applicants, a cancellation filter is proposed consisting of a combination of an adaptive digital filter and an adaptive analog filter to generate the cancellation signal with a delay as low as possible.

The production of a replica signal for cancellation by means of a digital or mixed analog/digital filter for the cancellation of crosstalk is carried out in practice with a certain delay, which comprises the time for the A/D conversion, for digital filtering, and for the D/A conversion, as well as for the analog reconstruction filtering. The cancellation circuit according to the European patent application EP 1 775 851 A1 can have at both input/output ends delay circuits or dead time circuits which should delay the crosstalk impulse response on a telecommunication cable, so that accordingly a cancellation unit has more time to cause the cancellation, and the analog circuit effort sinks or can even cease completely. Such a dead time element ideally should have a very steady amplitude response and a steady group delay, such that an input signal remains qualitatively unchanged and is merely delayed for a certain time t. Besides, the delay element, as a component of a filter with analog and digital filter coefficients, has a fixed delay time and realizes a delay of the signal to be filtered within a so-called "tapped-delay-line" structure. One implementation form of an analog dead time element according to the European patent application EP 1 775 851 A1 has two longitudinal inductances of the same value within the transmission line (or a pass-through circuit) and two diagonally cross-connected capacities, also of the same value. Several such circuits can be connected in front of one or both inputs/outputs in series.

Figure 6:
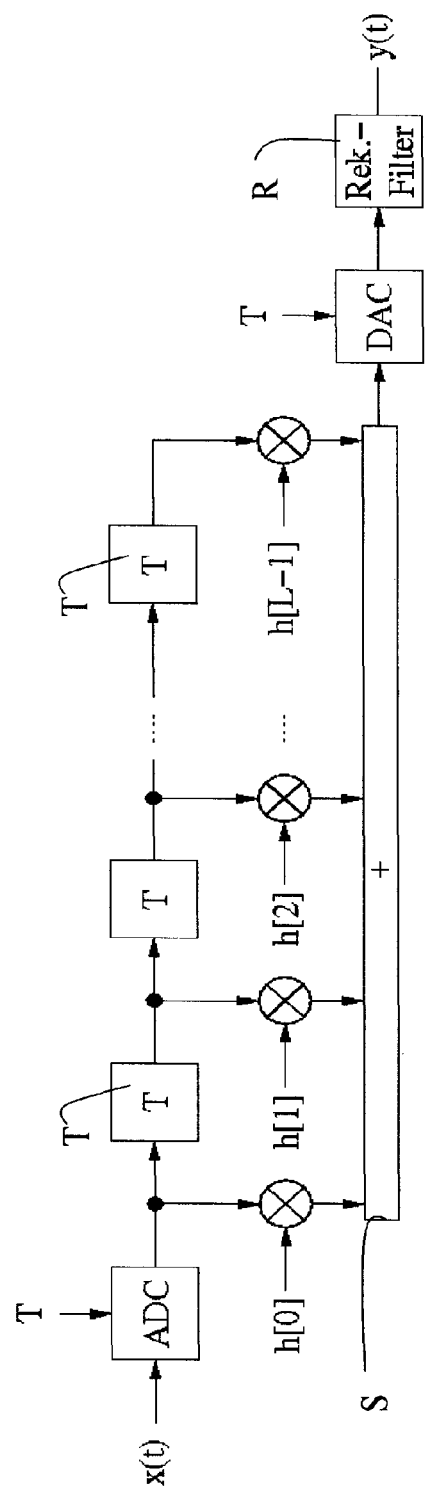

FIG. 6 shows an embodiment of a purely digital cancellation filter. The replica signal should be generated in a frequency range of $-1/(2T)$ to $1/(2T)$. For this purpose, the input signal x(t) is sampled by the A/D converter (ADC), is filtered digitally with clock rate 1/T, and D/A-converted (DAC) with clock rate 1/T and optionally equalized/smoothed by a reconstruction filter. Hence, it is referred as T-spaced canceller.

Transversal filter structures whose delay lines have taps with a spacing of a fraction of the "natural" symbol interval T are referred to in the literature as "fractionally spaced filter" (FSF). Such filters have already been applied for the solution of other problems. However, the properties of the fractionally spaced filter used thereby differ in principle from the prediction property which plays the key role in the FSC-XTC (fractionally spaced canceller-crosstalk canceller, as a special case of a FSF) for the cancellation of crosstalk.

For the first time where fractionally spaced filter for the equalization of the received signals were used, which are linearly distorted by data transmission over cables (fractionally spaced equalizer). First publications about this are the following papers "Allerton Conference on Circuit and System Theory", 1969, pp. 792-803, "Signal filtering with the transversal equalizer," from Lucky, R. W. and "Proceedings of IEEE International Conference on Communications 1970", 1970, pp. 21-35-21-39, "An adaptive coherent diversity receiver for data transmission through dispersive media," from Brady, D. M. Fractionally spaced equalizer (FSE) basically play a role because of the excess bandwidth by pulse shaping, usually used for digital modulation. Sampling and equalization of the received signal with the symbol rate 1/T is sufficient for baseband transmission (T-spaced equalizer).

For carrier modulated transmission it could come to distortions by channels which show in the lower and upper overlapping band different properties which cannot be completely equalized any more by a T-spaced equalizer. In such cases a fractionally spaced equalizer can be advantageous. Another advantage of the fractionally spaced equalizer is that his output signal can be interpolated at any phase of the symbol-rate sampling.

The latter advantage is also the main reason for the application of fractionally spaced echo cancellers (FSEC) for echo cancellation of digital data transmission over cables. Due to the possibility of an arbitrary interpolation of the output signal, complex synchronization mechanisms (e.g., master-slave synchronization) between the transceivers can be avoided. First publications about fractionally spaced echo canceller are described in the technical periodicals IEEE Transactions on Communications, 1977, vol. 25, pp. 654-666, paper "A Passband Data-Driven Echo Canceller for Full-Duplex Transmission on Two-Wire Circuits," from Weinstein, S. B. or "The Bell System Technical Journal," 1979, vol. 58, pp. 1593-1616, paper "Adaptive echo cancellation/AGC structures for two-wire full-duplex transmission on two-wire circuits," from Falconer, D. D. and Mueller, K. H. or "IEEE Journal on Selected Areas in Communications," 1984, vol. 2, pp. 722-730, paper "An Echo-Cancellation-Based 4800 Bit/s Full-Duplex DDD Modem," from Werner, J.-J. An improvement concerning the adaptation of the fractionally spaced echo canceller, such that the received signal is reconstructed and subtracted from the error signal used for the adaptation of the echo canceller is found in U.S. Pat. No. 6,996,230 B1.

In the technical periodical "IEEE Journal on Selected Areas in Communications, 1995, vol. 13, pp. 1643-1655", paper "Bandwidth-Efficient Digital Transmission over Unshielded Twisted-Pair Wiring," from Im, G. H. and Werner, J.-J., the principles "cancellation" and "equalization" are strictly separated on the basis of methods for reducing NEXT. The principle "cancellation" requires direct access to the transmitted data (or the transmit signal) of the interferer to be suppressed. Hence, the interfering signal can be cancelled almost completely.

Nevertheless, the principle "equalization" does not require this access, however, assumes a large bandwidth extension (large roll-off factor). For usual roll-off factors, an entire suppression of the interfering signal(s) cannot be carried out due to the functional principle, especially if there are several interferers. U.S. Pat. No. 6,553,085 B1 describes a combination of a fractionally spaced equalizer and a decision feedback equalizer to suppress crosstalk. The method needs no direct access to the crosstalk causing signals, but assumes transmit signals with a large bandwidth extension, as well as synchronous transmitters. Therefore, this technology has to be directly integrated into the transmission systems and cannot be located externally.

A "canceller" in the sense of the distinction according the above mentioned publication "Journal on Selected Areas in Communications, 1995, vol. 13, pp. 1643-1655", which works according to the principle of a "fractionally spaced filter" is presented in the conference publication "Proc. Globecom", 1986, pp. 15.3.1-15.3.7, paper "Cross Polarization Interference Canceller for QAM Digital Radio Systems with Asynchronous Clock and Carrier Signals" from Lankl, B., for the purpose of compensating cross polarization interferences (cross polarization interference canceller). Again, the property that the output signal of a fractionally spaced filter can be interpolated at any sample phase plays an important role here. It grants a greater insensitivity to variations in sampling phases between main and interfering signal.

Further development of this approach is given, e.g., in EP 0 522 534 B1, in which a cross polarization interference compensator with fractionally spaced coefficients is described for the avoidance of the skew phenomenon (where levels of zero and freely changing levels alternate). In detail, the cross polarization interference compensator encloses:

an initial analog/digital-converter to convert a first baseband signal preserved by
a first polarized wave into a first digital signal;
a second analog/digital-converter to convert a second baseband signal which is orthogonal to the first polarized wave and preserved from a second polarized wave into a second digital signal with an integer multiple of the symbol frequency for transmission data;
a filter device to convert the second digital signal to a cancellation signal with an integer multiple frequency of the symbol frequency for transmission data, whereby the filter device has adaptive coefficients controlled by an error signal in a compensated signal;
an adder to add the cancellation signal to the first digital signal in order to generate the compensated signal; and
an error signal generation device to generate the error signal with an integer multiple frequency of the symbol frequency for transmission data.

Since the cancellation results are fed back to the cancellation signal generator in the second half of the data intervals as well as in the first half, a cancellation signal output of the cancellation signal generator converges in the extreme case of $D/U=\infty$ to a level of zero. Hence, the skewing phenomenon does not occur.

Methods for identification of linear time-invariant and slowly time-variant systems, respectively, are used to estimate the transfer function and the impulse response, respectively, of an unknown system by observing input and output signals, where usually no influence on the choice of the input signal exists. If the input signal is not directly accessible, either agreed training signals are used for the system identification or methods for blind identification are applied.

In particular, identification of impulse responses and transfer functions, respectively, of transmission lines coupled by crosstalk is of interest here. For example, in DE 10 2007 018 585B4 of one of the applicants a device and a method for the identification of reciprocally coupled transmission lines is disclosed. For the determination and cancellation of interfering signals in a data transmission system, with at least two wire pairs of a symmetric line bundle, the device shows in detail:

connections for a both-sided connection of the wire pairs, dead time elements connected downstream, at least one cancellation circuit, connected downstream to said dead time elements, having an input for an interfering signal, and a cancellation signal source, which feeds a cancellation signal into the respective wire pair, an interference signal parameter determination device for determining at least one interference signal parameter characterizing the crosstalk interference with the help of a first signal and the interfering signal and a cancellation control unit, linked with the interference signal parameter determination device, which controls switching off and on of cancellation circuits, the adaptation of filter coefficients of an adaptive filter, and the cancellation signal source, in such a way that the interference signal parameter determination device does not carry out a direct estimate of a causal impulse response, but determines an noncausal discrete-time impulse, response whose Fourier transform replicates the transfer function of the causal continuous-time system up to the Nyquist frequency. Furthermore, a classification unit is provided which classifies the signals on the wire pairs or the signals of a data transmission system, which observes information distributed over the medium power cable or observes a signal obtained by tapping a power cable, according to their interfering property and/or its interfering sensitivity and controls then the allocation of cancellation circuits. Besides, the method can be applied several times for the identification of all reciprocally coupled wire pairs of the bundle of symmetrical transmission lines. Since in the case of NEXT two lines are reciprocally coupled, this method is suitable for the identification of NEXT paths. In the case of far-end crosstalk two circuits are not in each case reciprocally coupled, so that this method cannot be used here.

Figure 5:
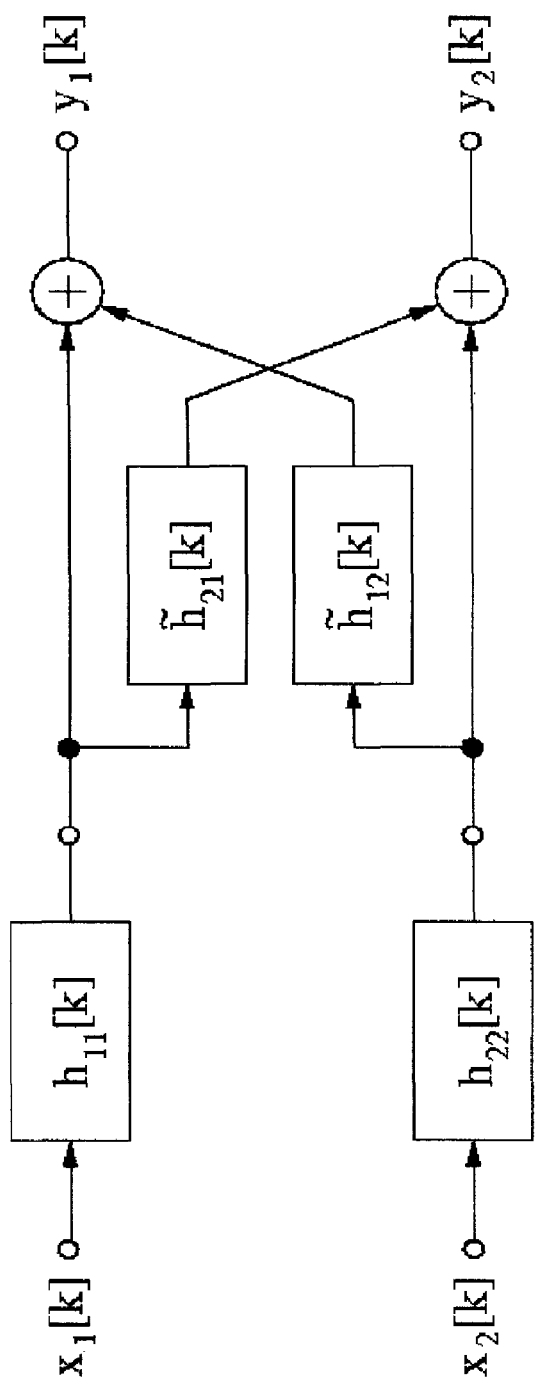

FIG. 5 shows a time-discrete system model of two transmission lines which are not reciprocally coupled (far-end crosstalk). The signals $x_1[k]$ and $x_2[k]$ denote the transmit signals which are fed at the near end of the lines. The impulse responses $h_{11}[k]$ and $h_{22}[k]$ characterize the direct paths of both lines. Both FEXT paths result from the concatenation of $h_{11}[k]$ and $\tilde{h}_{21}[k]$ and from the concatenation of $h_{2l}[k]$ and $\tilde{h}_{12}[k]$, respectively.

The impulse responses $\tilde{h}_{21}[k]$ and $\tilde{h}_{12}[k]$ represent the equal level far-end crosstalk (ELFEXT) paths, from which the direct paths of both lines are deducted.

The aim is to identify the ELFEXT impulse responses $\tilde{h}_{21}[k]$ and $\tilde{h}_{12}[k]$ from the observable signals $y_1[k]$ and $y_2[k]$. Without access to the fed signals $x_1[k]$ and $x_2[k]$ only the ELFEXT, but not the FEXT paths can be determined in principle.

The system model according to FIG. 5 does not show the transmit signals which are fed at the far end. Nevertheless, the actually observable line signals contain these signals. The preceding appreciation of the state-of-the-art shows that for different applications specifically designed devices and methods for cancellation and identification of crosstalk, in particular for NEXT, are known. Too little attention is paid to the situation, to be found in practice, of non-reciprocally coupled systems. Therefore, devices and methods for cancellation and identification of FEXT, which enable a reliable identification of an unknown system, are lacking in practice. This is especially significant since for many years the telecommunication industry is regarded as a modern and high-developed industry, which takes up improvements and simplifications fast and puts into practice.

Basis of this invention is the further development of known devices and methods for cancellation and identification of crosstalk within a communication system such that cancellation of FEXT, where wire pairs of the bundle of transmission lines are non-reciprocally coupled, is enabled.

This object is solved, based on a device for identification and cancellation of interfering signals in a communication system with at least two wire pairs of a bundle of symmetric transmission lines that includes connections to connect the signal lines on both sides of the pairs, dead time elements connected downstream of said connections, at least one cancellation circuit, connected downstream of said dead time elements, having an interfering signal input and a cancellation signal source, which feeds a cancellation signal into the respective wire pair, an interference characteristic detection device for determining at least one interference signal parameter characterizing the crosstalk interference by means of the signals of the involved wire pairs, and a cancellation control unit connected to said interference characteristic detection device, which controls the setting of filter coefficients of an adaptive filter and the cancellation signal source, such that for the delay of the filtered signal an additional delay element with adjustable delay time $\tau$ is placed in front of or behind the adaptive filter, which is a digital cancellation filter with delay elements with delay time T and filter coefficients with a tap spacing of T, and that the adjustment of the additional delay time $\tau$ is done jointly with the adaptation of the filter coefficients for cancellation of FEXT, where wire pairs are non-reciprocally coupled.

For the device according to the present invention, the artificial introduction of an additional delay, which leads to a better cancellation, is carried out for the first time compared to the appreciated state-of-the-art. Compared to the prior art according to EP 1 775 851 A1 showing a delay element as a component of a filter with analog and digital filter coefficients and with fixed delay time, the output signal of the cancellation filter is delayed with the additional adjustable delay element according to the present invention. A better adaptation of the transfer function of the digital cancellation filter (including the additional delay time) to the present crosstalk transfer function, which has to be approximated very exactly for cancellation purposes, is thereby reached for the first time. Comprehensive investigations and analyses have shown that for the cancellation of crosstalk by means of a T-spaced canceller a shorter delay time does not necessarily leads to a better cancellation result. The optimal size of the additional delay time $\tau$ is individually different. It depends on the present crosstalk situation, i.e., on the crosstalk causing and receiving wire pairs. For the device according to the present invention, the additional delay time $\tau$ for the cancellation filter is (automatically) adjustable.

Furthermore, this object is solved based on a device for identification and cancellation of interfering signals in a communication system with at least two wire pairs of a bundle of symmetric transmission lines that includes connections to connect the signal lines on both sides of the pairs, dead time elements connected downstream of said connections, at least one cancellation circuit, connected downstream of said dead time elements, having an interfering signal input and a cancellation signal source, which feeds a cancellation signal into the respective wire pair, an interference characteristic detection device for determining at least one interference signal parameter characterizing the crosstalk interference by means of the signals of the involved wire pairs, and a cancellation control unit connected to said interference characteristic detection device, which controls the setting of filter coefficients of an adaptive filter and the cancellation signal source, such that for the cancellation of FEXT, where wire pairs are non-reciprocally coupled, the adaptive filter is built by a digital cancellation filter, and that the input signal is A/D-converted by an A/D converter with rate M/T, that each of the filter coefficients are (temporarily) separated by K delay elements each with a delay time of T/M, and that the output signal of the cancellation filter is down-sampled by a sampling device (e.g, a decimator) by factor M and D/A-converted by a D/A converter with rate 1/T or alternatively the output signal of the cancellation filter is D/A-converted by a D/A converter with rate M/T (without prior decimation).

This device according to the present invention, which is based on a fractionally spaced filter, has the advantage that it permits the cancellation of crosstalk, especially of FEXT, independent of the communication systems, and within the scope of the invention can also be applied for the cancellation of NEXT, in particular it can be used within the scope of patent DE 10 2007 018 585 B4, of one of the applicants.

Furthermore, this object is solved based on a device for identification and cancellation of interfering signals in a communication system according to the invention, such that for the cancellation of FEXT, where wire pairs are non-reciprocally coupled, the adaptive filter is built by a digital cancellation filter with M parallel filter paths, that the input signal x(t) is A/D-converted by an A/D converter with rate 1/T, that in each of the M parallel filter paths the signals corresponding to the respective filter coefficients are D/A-converted by a D/A converter with rate 1/T, whose output signals, from the second filter path on, are individually delayed by a delay element or are output by the respective D/A converter with the corresponding delay, and that the M filter paths are fed to an adder S.

This embodiment according to the present invention has the advantage that oversampling can be omitted. Nevertheless, it has the disadvantage that M different D/A converters are required, whose output signals individually by an analogous delay element would pull become. Alternatively the delay again can occur through an accordingly delayed signal output in the D/A converter.

Furthermore, this object is solved based on a device for identification and cancellation of interfering signals in a communication system according to the invention, such that for the cancellation of FEXT, where wire pairs are non-reciprocally coupled, the adaptive filter is built by a digital cancellation filter with M parallel filter paths, that the input signal x(t) is A/D-converted by an A/D converter with rate T, and that each of the signals, which are linked within the subfilter with the filter coefficients, is fed via a selector switch to a D/A converter and is D/A-converted with rate T/M.

This embodiment according to the present invention has the advantage that the need for M D/A converters can be omitted, and that only one D/A converter is required, which is clocked, however, with M/T.

Furthermore, this object is solved based on a device for identification and cancellation of interfering signals in a communication system with at least two wire pairs of a bundle of symmetric transmission lines that includes dead time elements, a cancellation circuit, connected downstream of said dead time elements having an interfering signal input and a cancellation signal source, an interference characteristic detection device and a cancellation control linked unit connected to said interference characteristic detection device, whereby auto and cross-correlation functions AKF, KKF of the signals of all wire pairs are estimated, an adaptation and adjustment of filter coefficients of a digital cancellation filter, with first delay elements with delay time T and filter coefficients with a tap spacing of T, and with additional delay time τ, or that the input signal x(t) is A/D-converted by an A/D converter with rate M/T, that each of the filter coefficients are (temporarily) separated by K delay elements each with a delay time of T/M, or that in each of the M parallel filter paths the signals corresponding to the respective filter coefficients are D/A-converted by a D/A converter with rate 1/T, whose output signals, from the second filter path on, are individually delayed by a delay element or are output by the respective D/A converter with the corresponding delay, or that the input signal x(t) is A/D-converted by an A/D converter with rate 1/T, and that each of the signals, which are linked within the subfilter with the filter coefficients, is fed via a selector switch to a D/A converter and is D/A-converted with rate M/T, is carried out by arranging the estimated correlation values in suitable Hankel and Toeplitz matrices, a calculation of the approximate crosstalk impulse response is carried out, and switching on/off of the cancellation filter is employed, such that from the estimated cross correlation function the following vector is built $$\hat{\phi}_{y_1y_2} \stackrel{def}{=} [\hat{\phi}_{y_1y_2}_{(\hat{h}_{12})+1)]}[-(q_q^{(\hat{h}_{21})}+q_2^{(\hat{h}_{21})})], \ldots, \hat{\phi}_{y_1y_2}[q_1^{(\hat{h}_{12})}+q_2$$

and that both pulse responses are estimated, as follows, $$\begin{bmatrix} \hat{h}_{21} \\ \hat{h}_{12} \end{bmatrix} \stackrel{def}{=} ([\hat{\phi}_{y_1y_1} \quad \hat{\phi}_{y_2y_2}] + \delta \cdot I)^{-1} \hat{\phi}_{y_1y_2}$$

where the operator $(\bullet)^{-1}$ denotes matrix inversion, δ denotes a regularization constant (regularized estimation), and I denotes the identity matrix, and that both estimated impulse responses are employed for adjusting the cancellation filters for cancellation of FEXT, where wire pairs are non-reciprocally coupled, but not serve for identification of interfering signals.

This embodiment of the method according to the present invention has the advantage that both estimated impulse responses can serve for adjusting the cancellation filter/adaptive filter of a T-spaced crosstalk canceller, a T-spaced crosstalk canceller with adjustable delay time, or a fractionally spaced crosstalk canceller.

Figure 2:
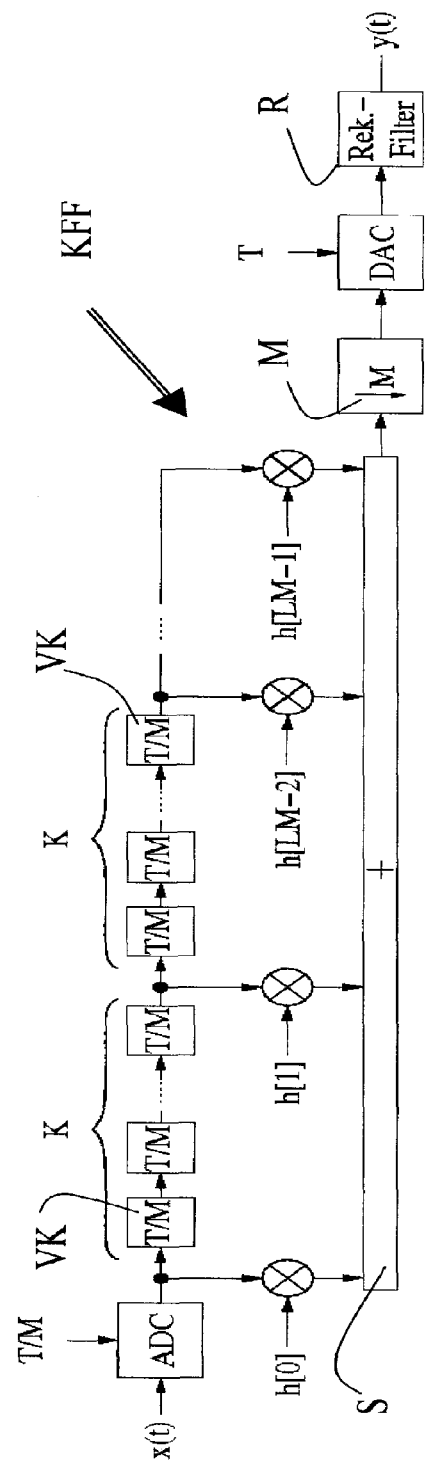
Figure 3:
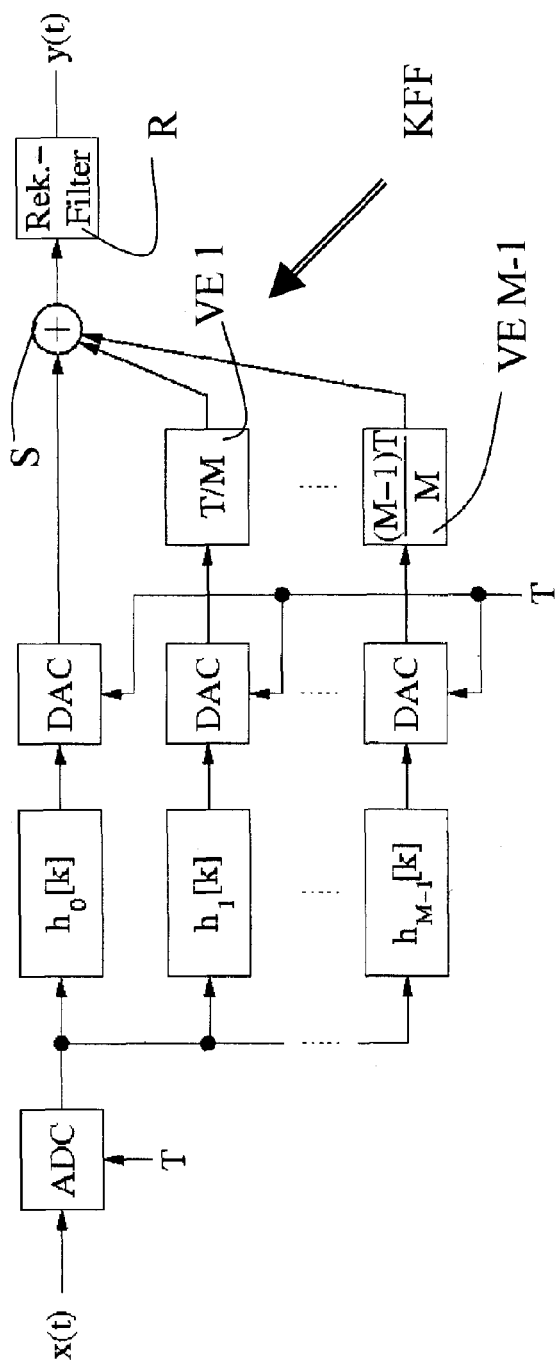
Figure 4:
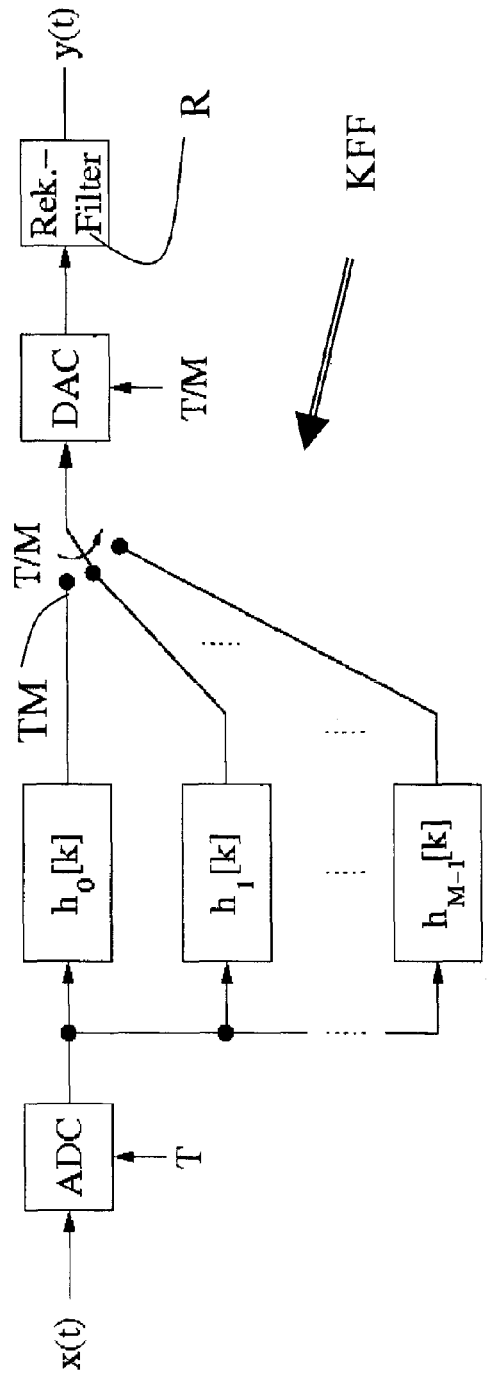
Figure 7:
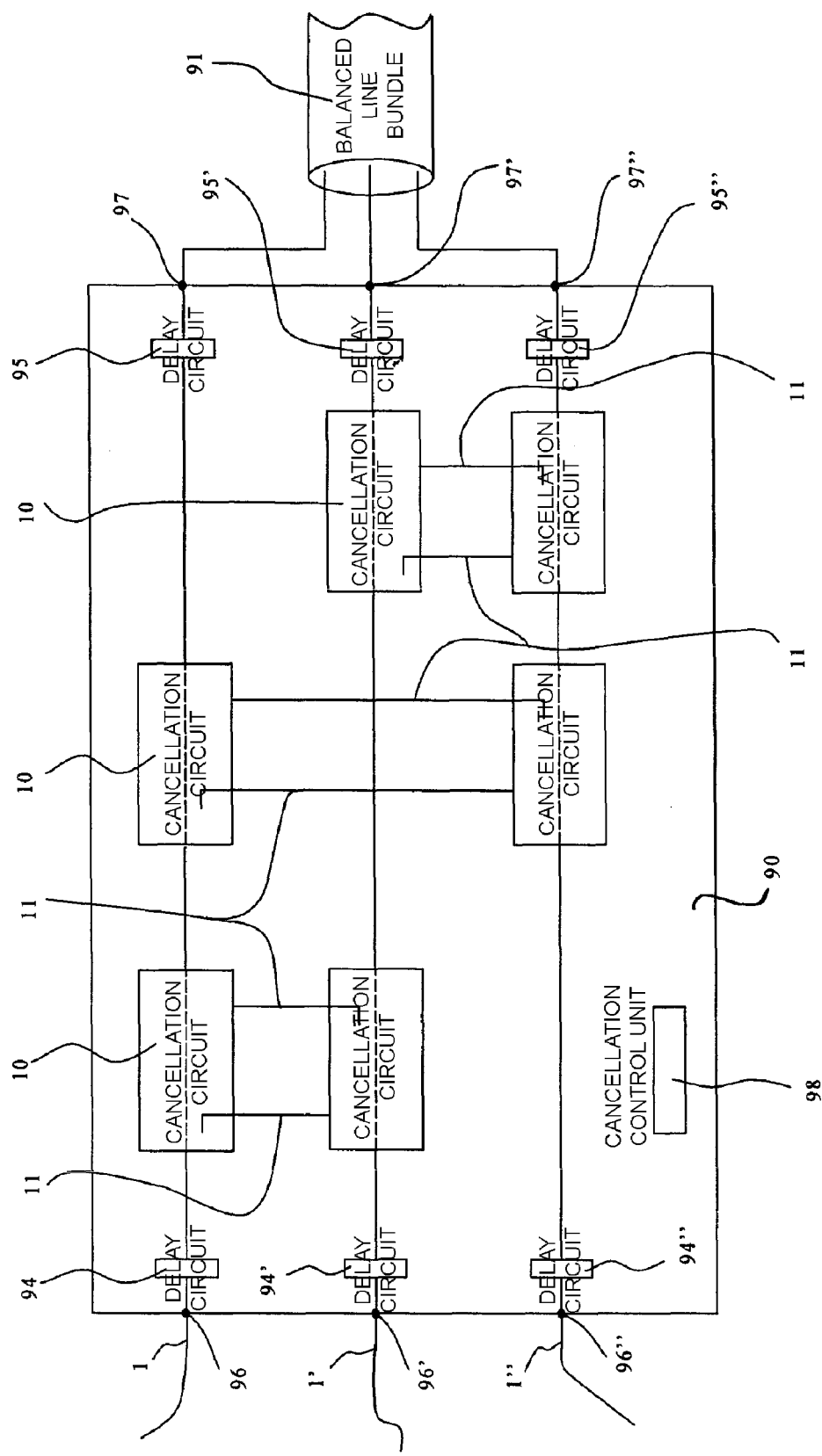
Figure 8:
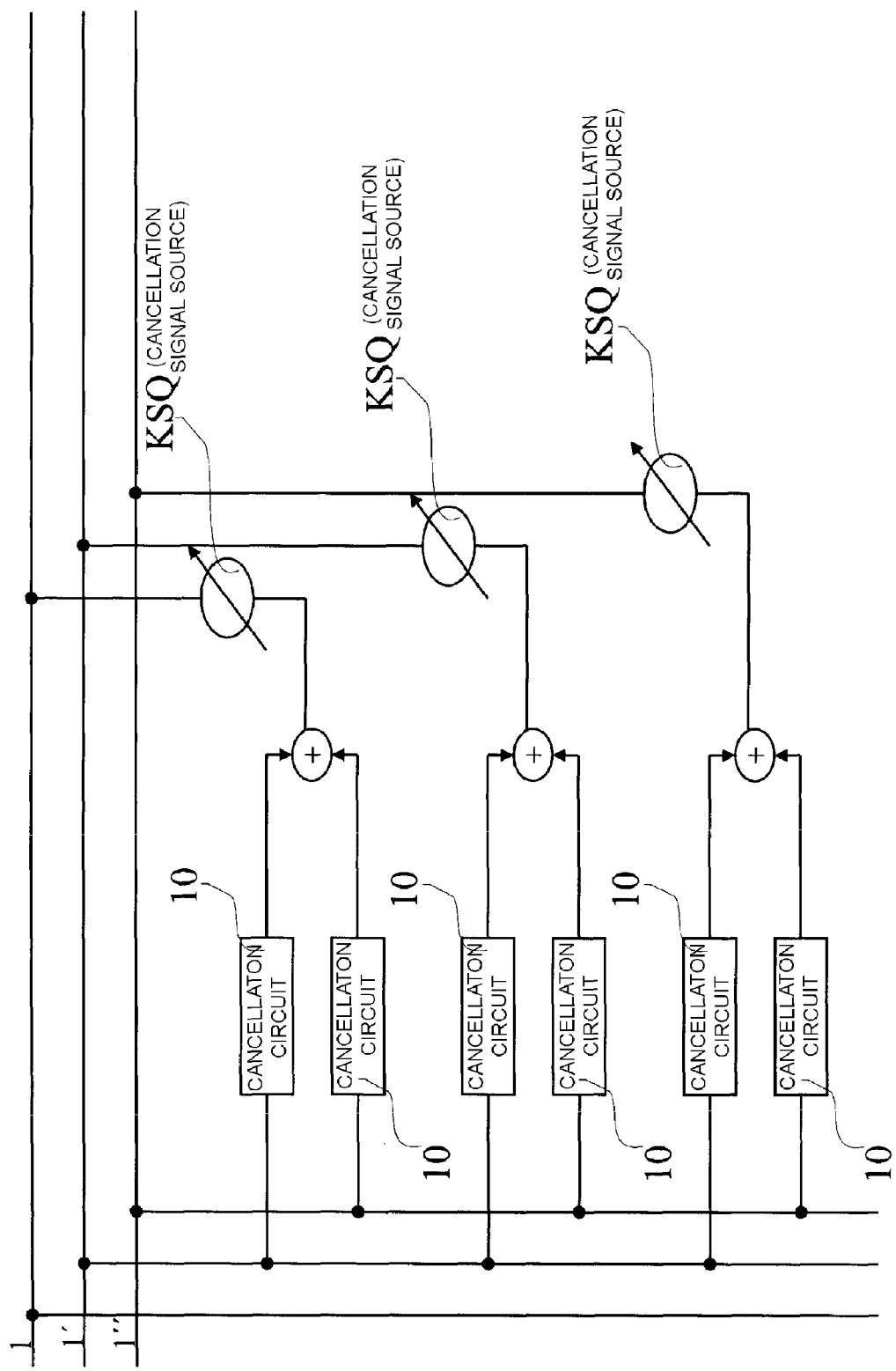

Further advantages and details can be taken from the following description of preferred embodiments of the invention with reference to the drawings. In the drawing:

FIG. 1 is a schematic representation of a first embodiment of the device according to the present invention for cancellation and identification of interfering signals in a communication system, FIG. 2 is a schematic representation of a second embodiment of the device according to the present invention, FIG. 3 is a schematic representation of a third embodiment of the device according to the present invention, FIG. 4 the schematic representation of a fourth embodiment of the device according to the present invention, FIG. 5 is a block diagram of a crosstalk system in form of a non-reciprocally coupled discrete-time system, FIG. 6 is a schematic representation of a digital cancellation filter, FIG. 7 is a schematic representation of an embodiment of the assembly in a communication system and FIG. 8 is a schematic representation of an embodiment of the aggregation of signals at the output of the cancellation circuit.

FIG. 7 shows an embodiment as described in the European patent application EP 1 775 851 of one of the applicants, whereby for each pair-wise cancellation to be carried out an own cancellation circuit 10 is provided, i.e., for three signal lines to be compensated 1, 1', 1" six cancellation circuits 10, each with an interfering signal input 11, have to be provided. The cancellation circuits have delay circuits or dead time circuits 94, 95 at both of their inputs/outputs. The compensation unit 90 may be provided as a unit and, accordingly, terminals 96 and 97 have the connection on both sides of the signal lines 1, 1' and 1". The signal lines are bi-directional on one or both sides of the circuit 10. Unit 90 may be part of a cable bundle 91. It is not possible to combine the interfering signals at the input side, i.e., at the signal input devices 11, such that only a single cancellation circuit 10 per signal circuit 1, 1', 1", is necessary, i.e., it is not possible to sum up reference signals of several wire pairs and to feed the cancellation circuit 10, such that it processes the sum signal. Nevertheless, summing up the signals at the output of the cancellation circuit 10 is possible (and due to implementation costs also a preferable implementation form).

FIG. 8 shows for the case of three wire pairs how cancellation signals for wire pair 1 for the cancellation of interfering signals caused by other wire pairs 1', 1" can be combined (at the output of cancellation circuit 10) and jointly fed to cancellation signal source KSQ. Therefore, only one cancellation signal source KSQ per wire pair 1 for cancellation is sufficient, which is advantageous.

If only one cancellation circuit 10 per wire pair is provided, also the generation of the cancellation control signal can be carried out separately for each wire pair according to the respective prevailing couplings (impulse responses or transfer functions), such that the control signals from single pair combinations can be summed up to a common control signal $u_s(t)$ for a jointly controlled current source. A central control of the unit 90 or of a single circuit 10 is symbolized by 98. Furthermore, an interference signal parameter determination device for determining at least one interference signal parameter characterizing the crosstalk interference with the help of a first signal and the interfering signal is connected with the cancellation control unit 98. The central control unit 98 can also control switching off and on of cancellation circuits 10 or adaptive filters. The adaptation of the adaptive filter or the cancellation circuit can be divided into two steps, the comparatively fast adaptation without running cancellation ("short-term adaptation") on the one hand and the slower adaptation or tracking of the adaptation with running cancellation ("long-term adaptation") on the other hand.

The interference signal parameter determination device delivers, e.g., an estimate of the present crosstalk impulse response $\tilde{h}[k]$ or the accompanying transfer function $$\tilde{H}(F) = \sum_{k=-q_1}^{q_2} \tilde{h}[k]e^{-j2\pi kF}, -\frac{1}{2} < F < \frac{1}{2}.$$

The transfer function of a T-spaced canceller with adjustable delay time $\tau$ is:

$$H(F) = \sum_{k=0}^{L-1} h[k]e^{-j2\pi(k+\tau/T)F}, -\frac{1}{2} < F < \frac{1}{2}.$$

A useful criterion for adapting the filter coefficients would be to minimize the mean squared error in the frequency domain, i.e., to determine the set of filter coefficients h[k] which minimizes the value of the following integral $$\int_{-1/2}^{1/2} \left| \tilde{H}(F) - \sum_{k=0}^{L-1} h[k]e^{-j2\pi(k+\tau/T)F} \right|^2 dF.$$

The transfer function of a FS-XTC or a FS-XTC-DSL in polyphase representation is given by:

$$H(F) = \sum_{\mu=0}^{M-1} \sum_{k=0}^{L_\mu-1} h_\mu[k]e^{-j2\pi(k+\mu/M)F}, -\frac{1}{2} < F < \frac{1}{2}.$$

A useful criterion for adapting the filter coefficients would be to minimize the mean squared error in the frequency domain, i.e., to determine the set of filter coefficients $h_\mu[k]$ which minimizes the value of the following integral $$\int_{-1/2}^{1/2} \left| \tilde{H}(F) - \sum_{\mu=0}^{M-1} \sum_{k=0}^{L_\mu-1} h_\mu[k]e^{-j2\pi(k+\mu/M)F} \right|^2 dF.$$

The above representation includes the determination of the coefficients of the FS-XTC and the FS-XTC-DSL. All subfilters of the FS-XTC have the same length, i.e., $L_0 = L_1 = \ldots = L_{M-1}$. For the FS-XTC-DSL the $L_\mu$ are different (i.e. the subfilters are of different lengths).

The embodiments according to the present invention of (digital) cancellation filter/circuits KFT, KFF, as described below by reference to FIG. 1 to FIG. 4, can be applied for different systems without any modifications of the system concept. It is especially advantageous that only a single reconfiguration by the user is necessary, who can toggle between the operating modes, particularly for cancellation of NEXT or FEXT, such that an operation according to user-specific demands of different systems is guaranteed.

Compared to the prior art the present invention of (digital) cancellation filter/circuits KFT, KFF, do not require parallel implementations of system parts and permit various possible applications at unexpectedly low costs, including the possibility for upgrading legacy systems as well as a flexible and cost-efficient design. In particular, the devices according to the present invention are transparent with regard to transmission rates, line codes, and other transmission parameters, and no training or synchronization methods are required.

Although below the embodiments of the solution according to the present invention are described for FEXT, the application of the concept according to the present invention can also be applied for NEXT (solely or in combination) or for other systems and user requirements, e.g., echo cancellation or suppression of external interferers like radio interferers. This is due to the fact that the concept according to the present invention is based on a configurable modular design, which allows an easy adaptation to the special circumstances and an integration without modification of the invention or the basic concept.

FIG. 1 shows the embodiment of the adaptive filter as a digital cancellation filter KFT with filter coefficients h[0], . . . , h[L−1], each separated by a first delay element T with delay time T, and with an adjustable additional delay time τ. The setting of the additional delay time τ is preferably carried out in combination with the setting of the filter coefficients h[0], h[L−1] for cancellation of FEXT, where wire pairs 1, 1' are not reciprocally coupled.

The artificial delay τ may be implemented in particular by an adjustable analog or digital delay element V with delay time τ, which is placed in front of an A/D converter ADC (in FIG. 1 not shown), behind a D/A converter DAC, or between A/D converter ADC and D/A converter DAC of the cancellation filter KFT.

Alternatively, the additional delay time τ can be implemented by delaying the A/D or the D/A conversion process of the A/D converter ADC or the D/A converter DAC, or by delaying the digital data, i.e., by use of a digital delay element.

The size of the additional delay time is preferably adapted in combination with the coefficients h[k] of the digital cancellation filter KFT to the transfer function to be imitated, which is provided by a crosstalk identification unit (for details see European patent application EP 1 775 851 A1 of one of the applicants, which is made here by reference to the contents of this patent application), e.g., by means of the method of least squared errors.

The second embodiment of the device according to the present invention, depicted in FIG. 2, shows a fractionally spaced crosstalk canceller (FS-XTC) in its most general form. The input signal x(t), which is (without loss of generality) assumed to be limited to the frequency band −1/(2T) to 1/(2T), is A/D-converted with rate M/T, i.e., it is oversampled by an integer factor M.

Each of the filter coefficients h[k] is temporally separated by K delay elements VK with delay time T/M. Finally, the output signal of the filter KFF is downsampled by factor M and D/A-converted with rate 1/T. Alternatively, downsampling by factor M can be omitted, but the D/A converter DAC has to be clocked M-times faster (clock rate M/T). The optional reconstruction filter R has to be adapted to the higher clock rate.

For the following implementations K=1 is assumed, nevertheless, the extension to K>1 is directly possible. If one decomposes the filter h[k] in its polyphase components according to $$h_\mu[k]=h[k \cdot M+\mu], k=0,1,\ldots,L-1, \mu=0,1,\ldots,M-1$$

the polyphase representation of the transfer function according to $$H(F) = \sum_{\mu=0}^{M-1} \sum_{k=0}^{L_\mu-1} h_\mu[k] e^{-j2\pi(k+\mu/M)F}, -\frac{1}{2} < F < \frac{1}{2}$$

enables an implementation which makes no use of oversampling, as it is shown in FIG. 3.

Nevertheless, omitting oversampling has the disadvantage that M different D/A converters DAC are required, whose output signals are individually delayed in each filter path by an analog or digital delay element VE 1, . . . , VE M−1.

Alternatively, the delay can again be realized by a respectively delayed signal output by the D/A converter DAC (not shown in FIG. 3).

In a further embodiment of the invention the fractionally spaced crosstalk canceller FS-XTC can be built up in an alternative polyphase representation according to FIG. 4. Advantageous of this implementation is that the need for M D/A converters DAC does not apply. Only a single D/A converter DAC is required, which is clocked, however, with rate M/T.

For the cancellation of crosstalk the cost-efficient choice K=1 and M=2 is preferable. The cancellation filter KFF according to FIG. 3 or FIG. 4 comprises only M=2 subfilters. Preferably, a fractionally spaced crosstalk canceller FS-XTC with different lengths of the subfilters $h_\mu[k]$, a so-called fractionally spaced crosstalk canceller with different subfilter lengths (FS-XTC-DSL), is used. For K=1 and M=2 it is reasonable to shorten the second subfilter. Since in the application case of crosstalk cancellation only a few (approx. 3-5) taps (filter coefficients) are necessary for the second subfilter, nearly 50% cost reduction is possible, without significant loss with respect to a structure with full filter lengths for all subfilters.

Since the input signal of the fractionally spaced crosstalk canceller FS-XTC is oversampled by factor M, this signal is a low pass signal which is predictable in principle to a certain degree. The filter coefficients of the fractionally spaced crosstalk canceller FS-XTC are adapted to the present transfer function, provided by the identification unit, such that its prediction capabilities are employed as well as possible. By such a choice, the attainable cancellation gains substantially exceed those of a T-spaced cancellers (see FIG. 6), and also those of a T-spaced cancellers with adjustable additional delay time (see FIG. 1).

In addition to the inherent prediction by means of the fractionally spaced crosstalk canceller FS-XTC/FS-XTC-DSL the signal x(t) is preferably fed to a prediction filter (not shown in FIG. 3 and FIG. 4), whose output signal represents the new input signal for the fractionally spaced crosstalk canceller FS-XTC or the fractionally spaced crosstalk canceller with different subfilter lengths FS-XTC-DSL.

In the system model according to FIG. 5, the transmit signals which are fed at the far end are not shown. Nevertheless, the actually observable line signals contain these signals. Since the transmit signals are neither correlated with each other nor with received signals, this simplified representation is allowed for the solution described in the sequel. From the observable signals $y_1[k]$ and $y_2[k]$ estimates of the autocorrelation function are made by averaging of $N_{sa\_to}$ different sample pairs, as follows, $$\hat{\phi}_{y_1 y_1}(\kappa) = \frac{1}{N_{sa}} \sum_{k=0}^{N_{sa}-1} y_1[k+\kappa] y_1[k]$$

$$\hat{\phi}_{y_2 y_2}(\kappa) = \frac{1}{N_{sa}} \sum_{k=0}^{N_{sa}-1} y_2[k+\kappa] y_2[k]$$

The estimation of the cross-correlation function is accomplished in the same manner $$\hat{\phi}_{y_1 y_2}(\kappa) = \frac{1}{N_{sa}} \sum_{k=0}^{N_{sa}-1} y_1[k+\kappa] y_2[k].$$

From autocorrelation function estimates for different values of κ the following Hankel matrix $$\hat{\bar{\phi}}_{y_1 y_1} \stackrel{def}{=} \begin{bmatrix} \hat{\phi}_{y_1 y_1}\left[-\left(2q_1^{(\tilde{h}_{21})} + q_2^{(\tilde{h}_{21})}\right)\right] & \cdots & \hat{\phi}_{y_1 y_1}\left[-q_1^{(\tilde{h}_{21})}\right] \\ \vdots & \ddots & \vdots \\ \hat{\phi}_{y_1 y_1}\left[-q_1^{(\tilde{h}_{21})} + q_1^{(\tilde{h}_{12})} + q_2^{(\tilde{h}_{12})} + 1\right] & \cdots & \hat{\phi}_{y_1 y_1}\left[q_1^{(\tilde{h}_{12})} + q_2^{(\tilde{h}_{12})} + q_2^{(\tilde{h}_{21})} + 1\right] \end{bmatrix}$$

and the following Toeplitz matrix $$\hat{\bar{\phi}}_{y_2 y_2} \stackrel{def}{=} \begin{bmatrix} \hat{\phi}_{y_2 y_2}\left[-q_1^{(\tilde{h}_{21})} + q_1^{(\tilde{h}_{12})} - q_2^{(\tilde{h}_{21})}\right] & \cdots & \hat{\phi}_{y_2 y_2}\left[-q_1^{(\tilde{h}_{21})} - \left(q_2^{(\tilde{h}_{12})} + q_2^{(\tilde{h}_{21})}\right)\right] \\ \vdots & \ddots & \vdots \\ \hat{\phi}_{y_2 y_2}\left[2q_1^{(\tilde{h}_{12})} + q_2^{(\tilde{h}_{12})} + 1\right] & \cdots & \hat{\phi}_{y_2 y_2}\left[q_1^{(\tilde{h}_{12})} + 1\right] \end{bmatrix}$$

is built.

The (positive) integer parameters $q_{1/2}^{(\cdot)}$ denote the length of the estimated impulse responses in vectorial representation, as follows, $$\tilde{h}_{21} \stackrel{def}{=} \left[\tilde{h}_{21}\left[-q_1^{(\tilde{h}_{21})}\right], \tilde{h}_{21}\left[-q_1^{(\tilde{h}_{21})}+1\right], \ldots, \tilde{h}_{21}\left[-q_2^{(\tilde{h}_{21})}\right]\right]^T$$

$$\tilde{h}_{12} \stackrel{def}{=} \left[\tilde{h}_{12}\left[-q_1^{(\tilde{h}_{12})}\right], \tilde{h}_{12}\left[-q_1^{(\tilde{h}_{12})}+1\right], \ldots, \tilde{h}_{12}\left[q_2^{(\tilde{h}_{12})}\right]\right]^T$$

From the estimated cross-correlation function the following vector $$\hat{\bar{\phi}}_{y_1 y_2} \stackrel{def}{=} [\hat{\phi}_{y_1 y_2}[-(q_1^{(\tilde{h}_{21})} + q_2^{(\tilde{h}_{21})})], \ldots, \hat{\phi}_{y_1 y_2}[q_1^{(\tilde{h}_{12})} + q_2^{(\tilde{h}_{12})} + 1]]^T$$

is built.

A reliable estimate of both impulse responses is given by $$\begin{bmatrix} \hat{\tilde{h}}_{21} \\ \hat{\tilde{h}}_{12} \end{bmatrix} \stackrel{def}{=} \left(\left[\hat{\bar{\phi}}_{y_1 y_1} \ \hat{\bar{\phi}}_{y_2 y_2}\right] + \delta \cdot I\right)^{-1} \hat{\bar{\phi}}_{y_1 y_2}$$

where the operator $(\bullet)^{-1}$ denotes matrix inversion and I the identity matrix, and both estimated impulse responses are employed for adjusting the cancellation filters for cancellation of FEXT, where wire pairs 1, 1' are non-reciprocally coupled.

A regularized estimate of both impulse responses can be optionally obtained by means of the positive parameter δ.

According to the present invention both estimated impulse responses serve for the adaptation of the digital cancellation filters KFT of a T-spaced crosstalk canceller, or a T-spaced crosstalk canceller with adjustable delay time, or a fractionally spaced crosstalk canceller.

The invention is not limited to the illustrated and described embodiments, but also encloses all embodiments with the same effect in the sense of this invention. Furthermore, the invention is not restricted to the combination of features defined in individual patent claims, but can also be defined by any other combination of specific features chosen from all disclosed single features.

This means that basically every single feature of the patent claims can be left out or be replaced by at least one single feature, disclosed elsewhere in this application.

The invention claimed is:

1. A device for identification and cancellation of interfering signals in a communication system with at least two pairs of wires of a balanced line bundle, comprising:
   connections to connect signal lines on both sides of the at least two pairs of wires;
   dead time elements for delaying a crosstalk impulse response between the at least two pairs of wires, said dead time elements being subordinated to said connections;
   at least one cancellation circuit, subordinated to said dead time elements, having an interfering signal input and a cancellation signal source, which feeds a cancellation signal into a respective pair of the at least two pairs of wires;
   an interference characteristic detection device for determining at least one interference signal parameter characterizing crosstalk interference by means of signals of the at least two pairs of wires when the at least one cancellation circuit is switched off, said at least one interference signal parameter being selected from an impulse response and a transfer function; and
   a cancellation control unit connected to said interference characteristic detection device, which controls a setting of filter coefficients of an adaptive filter and the cancellation signal source;
   wherein for the delay of the filtered signal an additional delay element with adjustable delay time τ greater than 0 seconds is placed in front of or behind said adaptive filter, which is a digital cancellation filter with first delay elements with delay time T greater than 0 seconds and filter coefficients with a tap spacing of T, wherein adjustment of the additional delay time τ is done jointly with adaptation of the filter coefficients for cancellation of far-end crosstalk, and wherein the at least two pairs of wires are non-reciprocally coupled.

2. The device according to claim 1, wherein the digital cancellation filter includes an A/D converter and a D/A converter, and wherein an analog or digital second delay element is employed, which is placed before the A/D converter, after the D/A converter or between the A/D converter and the D/A converter of the digital cancellation filter.

3. The device according to claim 1, wherein the digital cancellation filter includes an A/D converter and a D/A converter, and wherein the additional delay time τ is implemented by delaying the A/D or the D/A conversion process of the A/D converter or the D/A converter or by delaying digital data, and wherein the additional delay time τ is a fraction of sampling interval T.

4. The device according to claim 1, wherein for the generation of several cancellation signals for a N×N cancellation system, where N is an integer greater than 1 and represents the number of signal lines to be compensated, an N×(N−1) A/D converter and D/A converter are provided.

5. The device according to claim 1, wherein the interference characteristic detection device determines a size of the additional delay time τ by means of a method of least squared errors, and wherein the input signal x(t), which first is A/D-converted by an A/D converter, digitally filtered with rate 1/T, where T is period T, and D/A-converted by a D/A converter with rate 1/T, is finally equalized or smoothed by a reconstruction filter subordinated to the D/A converter.

6. A device for cancellation of and identification of interfering signals in a communication system with at least two pairs of wires of a balanced line bundle, comprising:
   connections to connect signal lines on both sides of said at least two pairs of wires;
   dead time elements for delaying a crosstalk impulse response between the at least two pairs of wires, said dead time elements being subordinated to said connections;
   at least one cancellation circuit, subordinated to said dead time elements, having an interfering signal input and a cancellation signal source, which feeds a cancellation signal into a respective pair of the at least two pairs of wires;
   an interference characteristic detection device for determining at least one interference signal parameter characterizing crosstalk interference by means of signals of the at least two pairs of wires when the at least one cancellation circuit is switched off, said at least one interference signal parameter being selected from an impulse response and a transfer function; and
   a cancellation control unit connected to said interference characteristic detection device, which controls an adaptation of filter coefficients of an adaptive filter and the cancellation signal source;
   wherein for the cancellation of far-end crosstalk, where wire pairs are non-reciprocally coupled, the adaptive filter comprises a digital cancellation filter with M parallel filter paths, wherein an input signal x(t) is A/D-converted by an A/D converter with rate M/T, where M is an integer number greater than 0 and T is period T, wherein each of the filter coefficients is separated by K delay elements each with a delay time of T/M, where K is an integer number greater than 0, and wherein an output signal of the cancellation filter is down-sampled by a sampling device by factor M and D/A-converted by a D/A converter with rate 1/T or, alternatively, the output signal of the cancellation filter is D/A-converted by a D/A converter with rate M/T.

7. A device for cancellation of and identification of interfering signals in a communication system with at least two pairs of wires of a balanced line bundle, comprising:
   connections to connect signal lines on both sides of said at least two pairs of wires;
   dead time elements for delaying a crosstalk impulse response between the at least two pairs of wires, said dead time elements being subordinated to said connections;
   at least one cancellation circuit, subordinated to said dead time elements, having an interfering signal input and a cancellation signal source, which feeds a cancellation signal into a respective pair of the at least two pairs of wires;
   an interference characteristic detection device for determining at least one interference signal parameter characterizing crosstalk interference by means of signals of the at least two pairs of wires when the at least one cancellation circuit is switched off, said at least one interference signal parameter being selected from an impulse response and a transfer function; and
   a cancellation control unit connected to said interference characteristic detection device, which controls an adaptation of filter coefficients of an adaptive filter and the cancellation signal source;
   wherein for the cancellation of far-end crosstalk, where wire pairs are non-reciprocally coupled, the adaptive filter comprises a digital cancellation filter with M parallel filter paths, wherein an input signal x(t) is A/D-converted by an A/D converter with rate T, wherein for each of the M parallel filter paths signals corresponding to the respective filter coefficients are D/A-converted by a D/A converter with rate 1/T, whose output signals, from the second filter path on, are individually delayed by a delay element or are output by the respective D/A converter with a corresponding delay, and wherein the M filter paths are fed to an adder.

8. A device for cancellation of and identification of interfering signals in a communication system with at least two pairs of wires of a balanced line bundle, comprising:
   connections to connect signal lines on both sides of said at least two pairs of wires;
   dead time elements for delaying a crosstalk impulse response between the at least two pairs of wires, said dead time elements being subordinated to said connections;
   at least one cancellation circuit, subordinated to said dead time elements, having an interfering signal input and a cancellation signal source, which feeds a cancellation signal into a respective pair of the at least two pairs of wires;
   an interference characteristic detection device for determining at least one interference signal parameter characterizing crosstalk interference by means of signals of the at least two pairs of wires when the at least one cancellation circuit is switched off, said at least one interference signal parameter being selected from an impulse response and a transfer function; and
   a cancellation control unit connected to said interference characteristic detection device, which controls an adaptation of filter coefficients of an adaptive filter and the cancellation signal source;

wherein for the cancellation of far-end crosstalk, where wire pairs are non-reciprocally coupled, the adaptive filter comprises a digital cancellation filter with M parallel filter paths, wherein an input signal x(t) is A/D-converted by an A/D converter with rate 1/T, and wherein an output signal, which is linked within a subfilter with the filter coefficients, is fed via a selector switch to a D/A converter and is D/A-converted with rate M/T, where M is an integer number greater than 0 and T is period T.

9. The device according to claim 6, wherein the output signal of the D/A converter is equalized or smoothed by a reconstruction filter subordinated to the D/A converter.

10. The device according to claim 6, wherein the input signal x(t) is limited to a frequency band from $-1/(2T)$ to $1/(2T)$.

11. The device according to claim 7, wherein the digital cancellation filter comprises subfilters of different lengths.

12. The device according to claim 7, wherein a prediction filter is added in front of the digital cancellation filter, and wherein an output signal of the prediction filter is the input signal x(t) of the digital cancellation filter.

13. The device according to claim 1, wherein the cancellation control unit controls switching off and on of cancellation circuits.

14. A method for identification and cancellation of interfering signals in a communication system with a device connected to at least two wire pairs of a balanced line bundle, which comprises dead time elements, a cancellation circuit, subordinated to said dead time elements having an interfering signal input and a cancellation signal source, an interference characteristic detection device and a cancellation control unit connected to said interference characteristic detection device, wherein:
  autocorrelation (AKF) and cross-correlation (KKF) functions of the signals of all wire pairs are estimated;
  an adaptation and adjustment of filter coefficients of a digital cancellation filter, with first delay elements with delay time T greater than 0 seconds and filter coefficients with a tap spacing of T, and with additional delay time $\tau$ greater than 0 seconds, or that the input signal x(t) is A/D-converted by an A/D converter with rate M/T, where M is an integer number greater than 0 and T is period T, that each of the filter coefficients are (temporarily) separated by K delay elements each with a delay time of T/M, or that in each of the M parallel filter paths the signals corresponding to the respective filter coefficients are D/A-converted by a D/A converter with rate 1/T, whose output signals, from the second filter path on, are individually delayed by a delay element or are output by the respective D/A converter with the corresponding delay, or that the input signal x(t) is A/D-converted by an A/D converter with rate 1/T, and that each of the signals, which are linked within the subfilter with the filter coefficients, is fed via a selector switch to a D/A converter and is D/A-converted with rate M/T, is carried out by arranging the estimated correlation values in suitable Hankel and Toeplitz matrices;
  a calculation of the approximate crosstalk impulse response is carried out; and
  switching on/off of the cancellation filter is employed; and
  wherein from the estimated cross-correlation function the vector $$\hat{\phi}_{y_1 y_2} \stackrel{def}{=} [\hat{\phi}_{y_1 y_2}[-(q_1^{(\tilde{h}_{21})} + q_2^{(\tilde{h}_{21})})], \ldots, \hat{\phi}_{y_1 y_2}[q_1^{(\tilde{h}_{12})} + q_{2_{(\tilde{h}_{12})}+1}]]^T$$

is formed and wherein both impulse responses are estimated, as follows, $$\begin{bmatrix} \hat{\tilde{h}}_{21} \\ \hat{\tilde{h}}_{12} \end{bmatrix} \stackrel{def}{=} ([\hat{\phi}_{y_1 y_1} \quad \hat{\phi}_{y_2 y_2}] + \delta \cdot I)^{-1} \hat{\phi}_{y_1 y_2},$$

where the operator $(\bullet)^{-1}$ denotes matrix inversion and I the identity matrix, and both estimated impulse responses are employed for adjusting the cancellation filters for cancellation of far-end crosstalk, where wire pairs are non-reciprocally coupled.

15. The method according to claim 14, wherein by means of a positive parameter $\delta$, where $\delta$ denotes a regularization constant, a regularized estimate of both impulse responses is obtained.

* * * * *